United States Patent Office 2,874,585
Patented Feb. 24, 1959

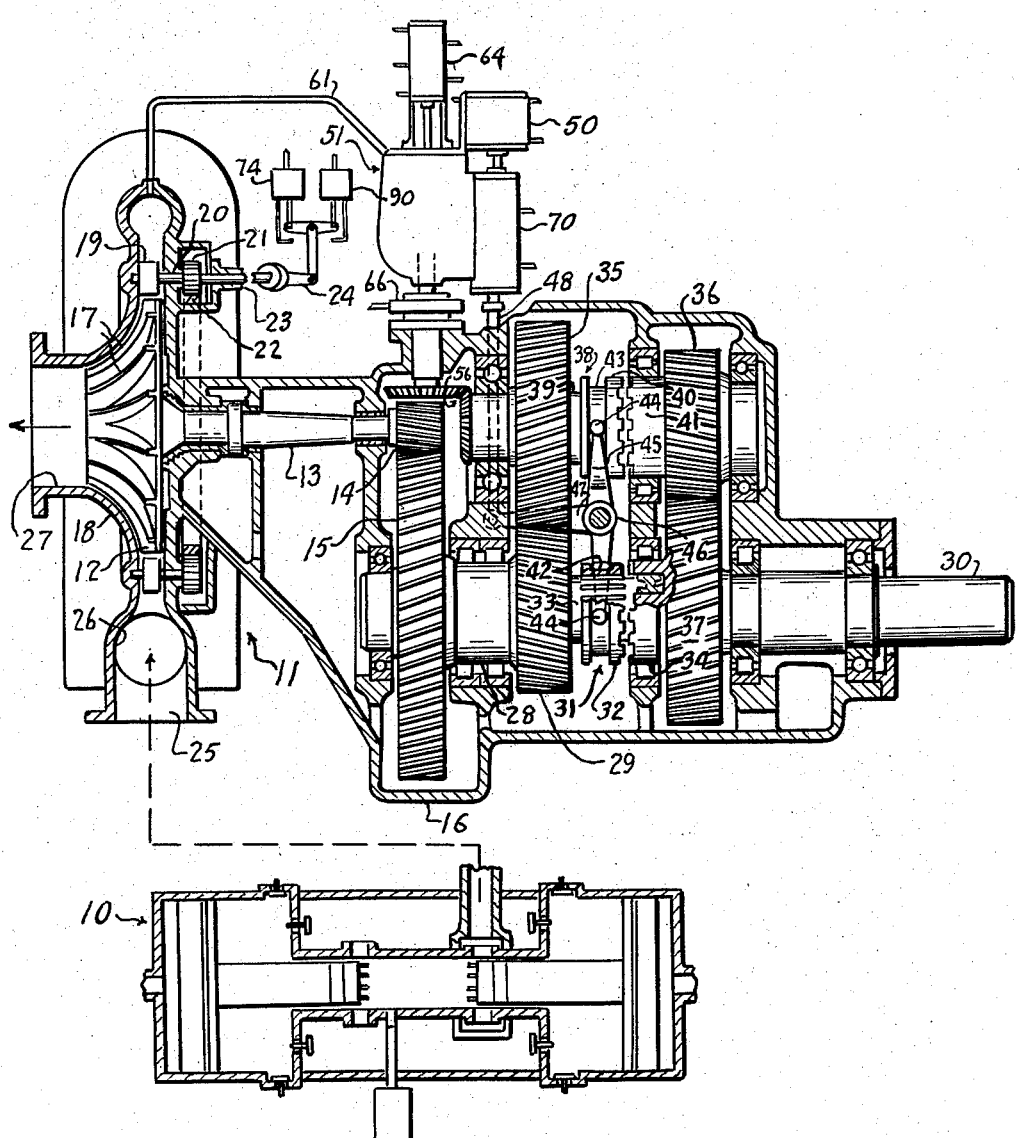

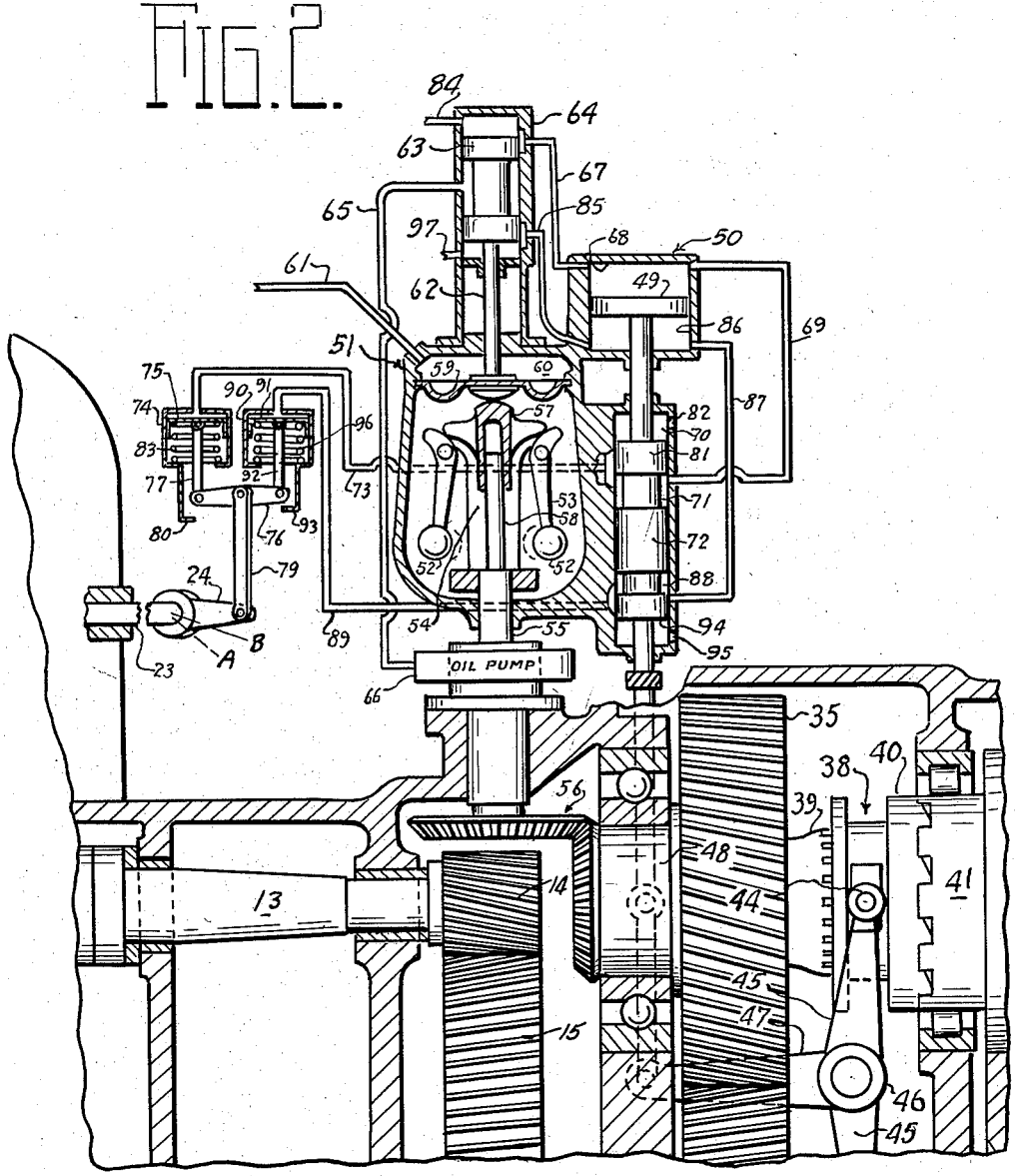

2,874,585

GAS TURBINE WITH AUTOMATIC SHIFT RESPONSIVE TO TURBINE SPEED AND GAS PRESSURE

Robert A. Lasley, Hamilton, Ohio, assignor to Baldwin-Lima-Hamilton Corporation, Hamilton, Ohio, a corporation of Pennsylvania Application December 16, 1957, Serial No. 703,081

6 Claims. (Cl. 74—336.5)

This invention relates to a prime mover or power plant including a free piston power gas generator connected to exhaust into a radial-in-flow gas turbine with adjustable guide vanes, the turbine being connected to the multi-speed gear transmission. The primary object of the invention is to provide means to maintain the correct or most efficient turbine speed for a given inlet pressure over a wider range of load and speed of the driven shaft than is normally attainable.

A free piston power gas generator can be adjusted to exhaust at any desired pressure within a rather wide range. Similarly, over a rather wide range a radial-in-flow-turbine presents a substantially fixed resistance to flow against which the gas generator exhausts, and thus constitutes an efficient load for a gas generator or of the free piston type. However, the turbine must operate at a speed within a relatively narrow range if it is to operate efficiently and since the load driven by the turbine may vary over a wider range of speeds than can be accommodated by the turbine, it is desirable to introduce a multi-speed transmission between the turbine and the load.

Many known radial-in-flow-turbines are or can be readily equipped with adjustable and reversible guide vanes which serve to direct the incoming gas at any selected angle with respect to the rotor blades. The present invention utilizes these adjustable and reversible guide vanes to make it possible to shift from one gear drive to another in a multi-speed transmission, and thus makes is possible to effectively couple a multi-speed gear transmission to a turbine in such a manner that the turbine can operate at its most efficient speeds for a given load and given inlet pressure.

The present invention, then, comprises the combination of a source of motive fluid, a turbine having adjustable and reversible guide vanes, a multi-speed transmission driven by the turbine and, it turn, driving a load, and means responsive to turbine speed and to turbine inlet pressure for shifting the multi-speed transmission and for momentarily shifting or reversing the guide vanes to remove the torque from the transmission in order that it may be shifted from one speed range to another.

While the invention has been shown in the accompanying drawings in conjunction with a two-speed transmission and in conjunction with a governor that is specifically disclosed, it should be appreciated that other multi-speed trasmissions and other governor types may be used.

The advantages of the invention will appear from the following detailed description thereof, reference being had to the accompanying drawings, in which—

Fig. 1 is a schematic view, in cross section of a turbine, a two-speed transmission, and controls embodying the invention; and Fig. 2 is a detailed view in cross section of the control elements shown in Fig. 1.

Fig. 1 shows a cross-sectional view of a diagrammatically indicated free piston power gas generator 10 exhausting into a turbine 11 having a rotor 12 attached to a shaft 13 which is connected to reduction gears 14 and 15 in a housing 16. A plurality of blades 17 extend radially from the rotor 12 in a passage formed between the rotor and a turbine housing 18. A plurality of adjustable guide vanes 19 and located adjacent the periphery of the rotor 12. These vanes are connected, in a well known manner, to shafts 20 and pinions 21 which mesh with a planetary ring gear 22. The planetary gear 22 is peripherally moved by one of the pinions 21 which is rotated through a stem 23 operatively connected to a crank arm 24. The blades 19 can thereby be changed from a forward-flow position to a neutral position or to a reverse-flow position by rotating the pinions 21 through the planetary gear 22. A gas inlet passage 25 admits gas from the gas generator 10 to an annular chamber 26 from which it flows radially inward past the vanes 19 and the blades 17, and out an exhaust passage 27.

The turbine drive gear 15 is attached to a first power gear 29 through a shaft 28 which drives a power load driving shaft 30 through a high speed clutch 31. The clutch 31 has a high speed jaw 32 which is splined to a shaft 33 which rotates with the shaft 28. The jaw 32 has teeth which coact with teeth of a high speed mating member 34 which is connected to, and rotates with, an output gear 37 splined or otherwise fixed on the load driving shaft 30.

Alternately, the drive may be through a low speed gear train consisting of the first power gear 29, a second constantly meshed gear 35 and a second output gear 36 constantly in mesh with the first output gear 37. A low speed clutch 38 operatively engages the low speed gear train by operatively connecting the shaft 39 on which gear 35 is splined to gear 36. The clutch 38 has a jaw 40 splined to the shaft 39 and which engages a low speed mating jaw member 41 attached to the gear 36. The teeth of the jaws of the clutch are of a particular, known design which enable them to positively engage when the respective jaws 32 or 40 are rotating at the same speed as the respective mating jaws 34 or 41 but to refuse engagement without damage when there is a difference in the rotative speed of the two jaws. The speed of rotation of the high speed jaw 32 is determined by the speed of the rotor 12. The speed of the low speed jaw 40 is equal to the speed of the jaw 32 multiplied by the ratio of the gear 29 to the gear 35. The speed of the high speed mating jaw or clutch member 34 is determined directly by the speed of the load driving shaft 30. The speed of the low speed clutch jaw member 41 is determined by the speed of the load driving shaft 30 multiplied by the ratio of the gear 37 to the gear 36.

If it is desired to shift from the high speed direct drive through the high speed clutch 31 to the low speed drive through the low speed gear train and the low speed clutch 38, the speed of the turbine 11 must be increased to synchronize the low speed jaw 40 and the low speed mating jaw member 41. Similarly, to shift from the low speed drive through the low speed gear train and the low speed clutch 38 to the high speed direct drive through the high speed clutch 31, the speed of the turbine 11 must be decreased to synchronize the high speed jaw 32 and the high speed mating member 34. For example, if the ratio of the second power gear 35 to the first power gear 29 is 3/2 and the ratio of the second driven gear 37 to the first driven gear 36 is also 3/2, then the speed of the turbine 11 must be increased by the product of these ratios, or 2¼ times, in order to synchronize the low speed jaw 40 and the low speed mating member 41 when shifting from the high speed clutch 31 to the low speed clutch 38. Similarly, to shift from the low speed clutch 38 to the high speed clutch 31, the speed of the turbine 11 must be decreased to ½.25 or approximately 44.4 percent of its former speed.

The movable high speed jaw 32 has the usual annular groove 42 and the low speed movable jaw 40 has a similar annular groove 43 in which shifting forks 44 of a shifting lever 45 are rotatably engaged. The clutch shifting lever 45 can be actuated by any suitable mechanism. In the form shown for purposes of illustration in the drawing, the lever 45 has a fulcrum 46 and is connected at one side of the drive housing to an arm 47 and a shifting piston rod 48. The piston rod 48 is attached to a shifting piston 49 in a shifting cylinder 50.

Any suitable governor may be used to control flow of operating fluid to the shifting piston 49. In the simple form shown in Fig. 2 a centrifugal governor 51 actuated by fly-balls 52 is used. The fly-balls are attached to rotatable levers 53 which are pivoted to arms 54 of a governor drive shaft 55 driven from a bevel gear set 56 operatively connected to the gear 35. The rotatable levers 53 have cam portions contacting a governor sleeve 57 slidably attached to a reduced portion 58 of the drive shaft 55. The force of the fly-balls is balanced or opposed by a diaphragm 59 retained in the housing 51 and having a central portion engaging the sleeve 57. The diaphragm 59 forms a movable wall of a chamber 60 with the housing 51 which communicates with the gas inlet 25 of the turbine 11 through a line 61 to create a pressure in the chamber 60 that is substantially equal to the gas pressure at the inlet 25. The governor is thus made responsive to turbine speed through its geared connection to the turbine drive gear and to turbine inlet pressure through the connection of chamber 60 to the line 61. An increase in pressure in the turbine inlet will cause diaphragm 59 to exert a greater pressure against the sleeve 57, while an increase in turbine speed will cause sleeve 57 to exert a greater pressure against diaphragm 59. The interaction of these forces is used to control the apparatus as herinafter set forth.

When the load on the driving shaft 30 increases, the speed of the turbine 11 decreases and causes the speed of the fly-balls 52 to decrease and tend to drop, due to the decrease in centrifugal force. The upward force exerted by the cam portions of the levers 53 on the sleeve 57 also decreases. As the speed of the turbine 11 decreases, the gas inlet pressure, however, does not change because the turbine provides the same resistance to flow. The gas pressure is transmitted to the chamber 60 through the conduit 61 and exerts its full downward force on the diaphragm 59 and, hence, the sleeve 57. The full downward force and the smaller upward force urges the sleeve 57 and the diagram 59 downwardly and causes a rod 62, connected to the diaphragm 59 and extending through the housing 51, to also move downwardly. The motion of rod 62 is used to position a valve controlling and actuating fluid to the piston 49.

When the load on the driving shaft 30 decreases, the speed of the turbine 11 increases, causing the speed of the fly-balls 52 to increase and to tend to move outwardly and upwardly due to the increased centrifugal force. The upward force exerted by the cam portions of the levers 53 on the sleeve 57 thereby increases. As the speed of the turbine 11 increases, the gas inlet pressure does not change since the turbine provides the same resistance to flow. The pressure in the chamber 60 then remains normal, thus exerting the same downward force on the diaphragm 59 and the sleeve 57. The normal downward force and the larger upward force urges the sleeve 57 and the diaphragm 59 upwardly and thus moves the rod 62 upwardly to position the control valve in the opposite sense to that resulting from an increase in load as above described.

The rod 62 is connected to a three-way control valve 63 acting in a valve cylinder 64 to control the flow of actuating fluid to the gear shifting power cylinder 50. Fluid is fed to the central portion of the cylinder 64 through a supply line 65 connected to the outlet of a fluid pump 66 which may be conveniently driven by the governor drive shaft 55. The valve 63 is centered when the turbine 11 is operated at normal speed and at a predetermined normal inlet pressure so that no fluid can flow past the supply valve cylinder 64. When the turbine speed increases and the gas pressure remains substantially constant, as when the low speed gear train is engaged with the shaft 30 and the load decreases, the rod 62 is moved upwardly and the valve 63 is moved upwardly to provide a connection between the supply line 65 and an outlet line 67 connected to an upper portion 68 of the shifting cylinder 50. Fluid then flows into the cylinder portion 68 and exerts a downward force on the shifting piston 49. At the same time, fluid flows through a line 69 to a second control valve cylinder 70 where it flows around a grooved portion 71 of a control valve piston 72, forming part of the shifting piston rod 48, and to a line 73. The latter line is connected to a first vane adjusting cylinder 74 wherein the fluid exerts outward pressure on a first vane adjusting piston 75 forcing a control lever 76 outwardly by means of a first connecting link 77. Outward movement of the lever 76 rotates the adjusting arm 24, to a position indicated by dotted line "A," by means of a link 79. The arm 24 rotates the rod 23 to change the angle of the guide vanes 19 so that the guide vanes assume a "reverse flow" position, in which the force of the gas flowing into the turbine acts against the blading in a reverse direction. The adjusting arm 24 is prevented from going past position "A" by a first stop 80 limiting outward movement of the control lever 76 and the first vane adjusting piston 75.

When the guide vanes 19 are moved to the reverse position, the turbine speed torque reverses rapidly and while it passes zero torque instantaneously removes the pressure between the teeth of the low speed jaw 40 and its associated low speed jaw member 41. At the same time the fluid pressure exerted downwardly on the shifting piston 49 causes the shifting arm 47 to move downwardly and disengage the jaw 40. There being no pressure between the teeth of the clutch jaws 40 and 41 this disengagement requires only a small force. As the speed of the turbine 11 further decreases, the speed of rotation of the high speed jaw 32 decreases and soon rotates at the same speed as the high speed mating jaw member 34 and the load driving shaft 30. The shaft 30, and the mating member 34, being driven through the low speed train of gears, were previously rotated at a much slower speed than the high speed jaw 32. When the speed of the high speed jaw 32 decreases sufficiently, the jaw 32 will snap into positive engagement with the mating member 34 because of the particular, known design of the jaw teeth and because of the fluid pressure which is still exerted downwardly on the shifting piston 49, due to fluid in the portion 68 of the shifting cylinder 50. As the piston 49 moves further downwardly, when the jaw 32 and the mating clutch member 34 are engaged, an enlarged portion 81 of the control valve 72 moves down past the line 73 and enables the line 73 to be open to the atmosphere through a vent 82 in the upper portion of the control valve cylinder 70 and thus enables the first vane adjusting piston 75 to revert to its former position by means of force exerted by a first spring 83. The guide vanes 19 then revert to their normal operating position and the turbine 11 resumes normal operation but now drives directly through the high speed clutch 31. The turbine 11 then accelerates to normal operating speed causing the diaphragm 59 to move upwardly to its normal position. This enables the fluid in the portion 68 of the shifting cylinder 50 to exhaust through a vent 84 in the supply valve cylinder 64. The shift from low gear to high gear has thus been accomplished.

With an increased load applied to the power driving shaft 30 when the turbine drives the shaft 30 directly or in high gear, the speed of the turbine 11 decreases and the pressure of the inlet gas stays substantially constant. Upward force on the diaphragm 59 decreases as the speed of the governor fly-balls drops and the constant downward pressure or force on the diaphragm increases over the upward force causing the diaphragm to move downwardly and the supply valve piston 63 likewise to move downwardly. Fluid from the supply line 65 is then passed through a line 85 to a lower portion 86 of the shifting cylinder 50 below the shifting piston 49 and exerts an upward force thereon. Fluid also passes through a line 87 and, with the shifting piston 49 and the control valve piston 72 in the lower position, as is the case when the high speed clutch 31 is engaged, fluid passes around a groove 88 in the control valve 72 to a line 89. This line is connected to a second vane adjusting cylinder 90 and the fluid forces a second vane adjusting piston 91 outwardly. The piston 91 moves the control lever 76 by means of a link 92 and thereby moves the arm 24 to a position indicated by dotted line "B." Movement past this position is prevented by a second stop 93. The guide vanes 19 are then moved to a "neutral" position in which inlet gas exerts force in both directions on the turbine blades 17. Pressure between the teeth of the high speed jaw 32 and its mating member 34 is momentarily relieved and the jaw 32 disengages and shifts to the neutral position, aided by the upward force of the fluid in the lower portion 86 of the cylinder 50 exerted on the shifting piston 49. At this point, flow of fluid to the line 89 is shut off by an enlarged portion 94 of the control valve piston 72 and, at the same time, fluid from the second vane adjusting cylinder 90 is exhausted through a vent 95 in the control valve cylinder 70. The second vane adjusting piston 91 then reverts to its original position by force of a second spring 96 and the vanes 19 revert to their original position, causing the turbine 11 to increase in speed very quickly since it is now disconnected from the power driving shaft 30. The speed increases until the speed of the low speed jaw 40 reaches the speed of its mating member 41 which was rotated at a substantially higher speed through the high speed clutch 31, before being disengaged. When synchronized, the jaw 40 and its mating member 41 move into positive engagement, aided by upward pressure of the fluid in the portion 86 of the shifting cylinder 50 exerted on the piston 49. This completes the engagement of the low speed clutch. The speed and the gas pressure of the turbine are then normal and the diaphragm 59 reverts to its normal position. The supply valve piston 63 likewise reverts to its neutral position and fluid in the lower portion 86 of the cylinder 50 exhausts through a vent 97 in the supply valve cylinder 64. The turbine 11 then drives the load through the low speed gear train 29, 35, 36 and 37.

The vane adjusting arm 24 can also be manually operated to place the vanes 19 in a neutral position to stop the effective force of the inlet gas on the blades 17 without stopping gas flow. Further, the vanes 19 can be placed in the reversed position by manual operation of the arm 24 to enable the turbine 11 to act as a brake.

To summarize the operation, when the low speed gear train is operatively engaged with the load through shaft 30 and the low speed clutch 38, a decrease in load on the take-off shaft 30 causes the turbine speed to increase. The unit is then in such condition that the load can be driven through a higher speed gear train. The diaphragm 59 is moved upwardly in response to the change in speed and the supply valve piston 63 is moved upwardly. Fluid from the pump 66 then flows through the upper portion 68 of the shifting cylinder 50 and tends to urge the shifting piston 49 downwardly. The fluid also flows to the first vane adjusting cylinder 74 to move the first vane adjusting piston 75 outwardly so as to move the guide vanes 19 to the reverse flow position. The turbine 11 then slows down and the low speed clutch 38 is disengaged. The turbine continus to slow down until the rotation of the high speed jaw 32 synchronizes with the speed of its mating member 34 at which time the high speed clutch 31 engages. Fluid in the first vane adjusting cylinder 74 is then vented and the vanes 19 revert to their normal position. The shift from low to high gear is thus complete.

If the turbine and its drive are running in high gear and the turbine is unable to carry the imposed load through this gear train, an automatic shift from high to low takes place. In this circumstance the turbine speed falls off, reducing the pressure of the governor weights against the diaphragm 59, while the turbine inlet pressure maintains its force on the diaphragm. The valve piston 63 then moves downwardly thus putting an actuating fluid pressure on the clutch shifting piston 49 and on the vane adjusting piston 91. The turbine instantaneously removes its driving pressure from the gearing so that the high speed clutch can be readily disengaged. The turbine speeds up with no load imposed on it until the low speed clutch 40—41 can be engaged, and when the clutch parts reach synchronism engagement takes place and operation of the drive continues on the low range. For more than two gear ratio steps additional governors like 51 and hydraulic controls like 64 and 70 with additional shifting clutch and gear arrangements to suit any desired gear change characteristic can be added to the system with the fly-ball and diaphragm force balance adjusted to additional desired shifting speed values.

The above description of the operation assumes a constant setting of the power gas generator and a change in load conditions. The operation is, of course, similar if the load remains constant and the operator changes the fuel setting and thus the output of the gas generator. In many instances this adjustment will be made in order to select the most efficient operating conditions for that unit. The present invention will then serve to change the transmission to accommodate the change in gas pressure being supplied to the turbine and will select the proper gear ratio for optimum efficiency.

The above has been intended to serve in an illustrative and not a limiting sense, it being understood that many modifications can be made without departing from the scope of the invention as set forth in the appended claims. Particularly, more than two drives may be employed by making modifications in the above-discussed embodiment, and other types of clutches than the jaw clutches illustrated can be employed or in case of planetary gearing suitable brake or clutch mechanisms can be employed to be operated by the shifting arrangements described for the automatic change of turbine to drive shaft speed ratios.

What I claim is:

1. In combination, a source of power fluid, a turbine connected to said source and having adjustable guide vanes, a turbine shaft, a load driving shaft, a first means for connecting said turbine shaft to said driving shaft to drive said driving shaft at a high rate of speed, second means for connecting said turbine shaft to said driving shaft to drive said driving shaft at a lower rate of speed, means responsive to turbine speed and to turbine inlet pressure, and means operatively connected to said speed and pressure responsive means for adjusting the angle of said turbine guide vanes and for connecting said first and second means individually to said driving shaft.

2. In combination, a source of power fluid, a turbine connected to said source and having adjustable guide vanes, a turbine shaft, a load driving shaft, first means for connecting said turbine shaft to said driving shaft to drive said driving shaft at a high rate of speed, second means for connecting said turbine shaft to said driving shaft to drive said driving shaft at a lower rate of speed, shifting means for alternately engaging said first and second means with said driving shaft, adjusting means for changing the angle of said turbine guide vanes, and a control system including means for motivating said shifting means and said vane adjusting means and means operatively connected to said motivating means and operating in response to the speed of said turbine and the pressure of the gas admitted thereto.

3. In combination, a source of power fluid, a turbine connected to said source and having adjustable guide vanes, a turbine shaft, a load driving shaft, first means for connecting said turbine shaft to said driving shaft to drive said driving shaft at a high rate of speed, second means for connecting said turbine shaft to said driving shaft to drive said driving shaft at a lower rate of speed, clutch means for individually and alternately engaging said first and second means, shifting means for moving said clutch means between positions engageable with either of said first and second means and a neutral position, adjusting means for changing the angles of said turbine guide vanes, and a control system including means for actuating said shifting means and said adjusting means, said actuating means being operatively connected to means responsive to the speed of said turbine and the pressure of the gas admitted thereto.

4. In combination, a source of power fluid, a turbine connected to said source and having adjustable guide vanes, a turbine shaft, a load driving shaft, first means for connecting said turbine shaft to said driving shaft to drive said driving shaft at a high rate of speed, second means for connecting said turbine shaft to said driving shaft to drive said driving shaft at a lower rate of speed, clutch means for individually and alternately engaging said first and second means, shifting means for moving said clutch means between positions engageable with either of said first and second means and a neutral position, adjusting means for changing the angle of said turbine vanes, control means responsive to the speed and inlet gas pressure of said turbine and means operatively connected to said control means for controlling said adjusting means and said shifting means to move said clutch means to a neutral position from a postion engageable with one of said first and second means and from said neutral position to a position engageable with the other of said first and second means.

5. In combination, a source of power fluid, a turbine connected to said source and having adjustable guide vanes, a turbine shaft, a load driving shaft, first means for connecting said turbine shaft to said driving shaft to drive said driving shaft at a high rate of speed, second means for connecting said turbine shaft to said driving shaft to drive said driving shaft at a lower rate of speed, clutch means for individually and alternately engaging said first and second means, and operating piston for moving said clutch means from engagement with either of said first and second means to a neutral position and into a position engageable with the other of said first and second means, vane adjusting pistons operatively connected to said turbine guide vanes, and a fluid control system including means for motivating said clutch operaating piston and said vane adjusting pistons, and means operatively connected to said motivating means and movable in response to the speed of said turbine and the pressure of the gas admitted thereto.

6. In combination, a sourve of power fluid, a turbine connected to said source and having adjustable guide vanes, a turbine shaft, a load driving shaft, first means for connecting said turbine shaft to said driving shaft to drive said driving shaft at a high rate of speed, second means for connecting said turbine shaft to said driving shaft to drive said driving shaft at a lower rate of speed, clutch means for individually and alternately engaging said first and second means, shifting means for moving said clutch means between positions engageable with said first and second means and a neutral position, a governor responsive to the speed and gas inlet pressure to said turbine, adjusting means for changing the angle of said adjustable inlet guide vanes, and a fluid valve controlled by said governor, and fluid actuated piston means operatively associated with said fluid valve for actuating said shifting means and said adjusting means to shift said clutch means and change the angle of said vanes in response to changes in the speed and gas pressure of said turbine to engage said turbine shaft and said driving shaft through said first means when the load on said driving shaft decreases to a predetermined value and to engage said turbine shaft and said driving shaft through said second means when the load on said driving shaft increases to a predetermined value.

No references cited.